United States Patent [19]

Didomenico, Jr.

[11] 4,246,376

[45] Jan. 20, 1981

[54] CURING AGENTS

[75] Inventor: Edward Didomenico, Jr., Anoka, Minn.

[73] Assignee: Henkel Corporation, Minneapolis, Minn.

[21] Appl. No.: 74,369

[22] Filed: Sep. 10, 1979

[51] Int. Cl.³ .................. C08G 6/00; C08L 61/02
[52] U.S. Cl. ............................ 525/398; 525/403; 525/410; 528/230; 528/259; 528/265; 528/266
[58] Field of Search .................. 525/398, 403, 410; 528/230, 259, 265, 266

[56] References Cited

U.S. PATENT DOCUMENTS

| | | | |
|---|---|---|---|
| 2,678,328 | 5/1954 | Suen | 528/259 |
| 3,741,935 | 6/1973 | Dowbenko | 528/259 |
| 4,101,603 | 7/1978 | Smith et al. | 525/443 |
| 4,119,762 | 10/1978 | Anderson | 528/254 |

*Primary Examiner*—Lucille M. Phynes
*Attorney, Agent, or Firm*—Forrest L. Collins

[57] ABSTRACT

Coating compositions comprising methylolamino compounds are cured with high molecular weight fatty diols and higher polyols.

10 Claims, No Drawings

CURING AGENTS

BACKGROUND OF THE INVENTION

1. Field of the Invention

The present invention relates to methylolamino curing agents.

2. Description of the Art Practices

Melamine was first developed by Von Liebig in 1834 and since that time various alkoxy derivatives of melamine have been utilized in the coating art by the transetherification with various polyhydric compounds.

Among some of the art describing the curing of alkoxymethylaminotriazenes (melamineformaldehyde resins) are U.S. Pat. No. 3,449,467 issued to Wynstra on June 10, 1969 and U.S. Pat. No. 3,668,276 issued on June 6, 1972 to Riemhofer et al. The aforementioned patents disclose hydroxy polyesters of moderately high molecular weight aminoplasts. U.S. Pat. No. 3,852,375 issued Dec. 3, 1974 to Biethan et al and 3,920,595 issued Nov. 18, 1975 to Anderson et al and 3,959,201 issued May 25, 1976 to Chang each disclose high solids coating compositions comprising blends of hydroxy polyesters of moderately low molecular weight and aminoplast curing agents.

Furthermore, U.S. Pat. No. 3,980,732 issued Sept. 14, 1976 to Isaksen et al and U.S. Pat. No. 3,994,851 issued Nov. 30, 1976 to Chang also disclose the use of material which relates to the present invention. U.S. Pat. No. 4,119,762 issued to Anderson et al on Oct. 10, 1978 also discloses the use of low molecular weight polyols as curing agents for melamine type resins. An overview of the use of melamine type materials as coating agents is found in "Organic Coating Technology", Volume 1 by Henry Fleming Payne, published by John Wiley & Sons, Inc., copyright 1954, fourth printing, pages 333,350; a similar disclosure of melamine resins is found at Chapter 46 (Petropoulos et al) of a book entitled "Applied Polymer Science", published by the American Chemical Society, 1975.

Melamine resins are also discussed in a reprint of an article entitled "A New Approach To Formulation of WaterBorne Coatings" found in the August 1977 issue of the Journal of Coatings Technology, Volume 49; Number 631; Pages 4659. Similarly an article by Golownia entitled "High Solids Coatings For Appliances" found in the publication High Solids Coatings, June 1978, Pages 214. The performance expectation needs of the appliance coating industry are described.

Melaminepolyol coating compositions are disclosed in British Pat. No. 1,308,697 issued Feb. 28, 1973. Moreover, U.S. Pat. No. 3,741,935 to Dowbenko issued June 26, 1973 describes high solids thermosetting coating compositions containing melamine materials. In German OLS 2,326,598 issued Dec. 6, 1973 in the name of Henshawl et al melamine curing agents are disclosed.

Chang in German OLS No. 2,447,812 issued Apr. 17, 1975 describes various caprolactone adducts of melamine derivatives. In Japanese Pat. No. 76 95,493 issued Aug. 21, 1976 polyol condensed melamine resins are described by Harada et al. Resin coating compositions for plastic products are also described in another Japanese Pat. No. 76 97,634 also to Harada et al. Polycaprolactone polyol derivatives of melamine products and low molecular weight polyols are described in U.S. Pat. No. 4,101,603 issued July 18, 1978 to Smith et al.

U.S. Pat. No. 4,113,793 to Sekmakas issued Sept. 12, 1978 describes high solids rapid curing thermosetting melamine derivative products. The present invention is also concerned with a known diol as reported in U.S. Pat. No. 3,243,414 issued Mar. 29, 1966 to DeWitt et al. In addition, the higher polyols are described in a United States Patent application to Rogier, but which does not suggest the use of such materials as melamine curing agents.

The term methylolamino compound denotes the product of an amino compound and an aldehyde (usually formaldehyde giving rise to the methyl term) which is useful in forming resins. Ordinarily these materials are etherified or partially etherified to obtain an alkoxy derivative of methylolamino compound which is then used as the resin and these terms are used interchangeably.

Thus, embraced herein are materials shown in the formulas below as the polyfunctional amino compound

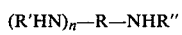
$(R'HN)_n-R-NHR''$ where n is 1 or greater, R' and R" are hydrogen or other groups including cyclo forming carbons and where R is a carbon containing backbone.

Throughout the specification and claims percentages and ratios are by weight and temperatures are in degrees of Celsius unless otherwise indicated. The foregoing references to the extent applicable are herein incorporated by reference.

SUMMARY OF THE INVENTION

The present invention describes a composition of matter which is the product of a methylolamino compound and a member selected from the group consisting of:

(a) 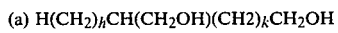
$H(CH_2)_hCH(CH_2OH)(CH_2)_kCH_2OH$ and (b) 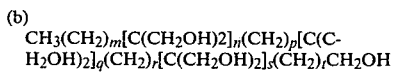
$CH_3(CH_2)_m[C(CH_2OH)2]_n(CH_2)_p[C(CH_2OH)2]_q(CH_2)_r[C(CH_2OH)2]_s(CH_2)_tCH_2OH$ and mixtures thereof wherein n plus q plus s are integers the sum of which is from 1 to 3; k and t are 3 or greater; n, q, and s are 0 or 1; m through t are integers the sum of which is from 12 to 20; and, h plus k are nonzero integers the sum of which is from 12 to 20.

DETAILED DESCRIPTION OF THE INVENTION

The products of the present invention as previously noted are highly useful in forming coatings particularly coatings for laundry appliances, refrigerators, and generally for any metal requiring a protective coating. In particular, the compositions of the present invention are highly useful in the area of high solids coatings requiring little or no volatile solvent in the product. It, for instance, has been extremely difficult to formulate coatings such as are described herein wherein high molecular weight alcohols are employed. That is, high molecular weight alcohols are ordinarily solid materials. However, in the aspect of using the trifunctional alcohols and the diol described herein, liquid coating compositions are provided which exceed 70% solids and in some cases up to 100% solids using conventional coating equipment such as high speed electrostatic disk applicators, conventional spray equipment, and hand application such as brushing.

Among the benefits in utilizing the technology of the present invention are that the alcohols used herein provide low viscosity amino crosslinking agents which can be air sprayed at high volume solids. Secondly, the alcohols of the present invention contain only primary hydroxyl groups which results in a faster and more complete reaction with the amine crosslinking agents. This, incidentally, results in lower temperature cured films having low catalyst requirements.

Additional advantages to utilizing the alcohols of the present invention to form the methylolamino compound reaction products are that there is no unsaturation in the alcohol which might detract from color or gloss retention. Similarly, there are no ether linkages in the alcohol which might detract from chemical resistance or disadvantageous properties in color and gloss retention. There are no secondary hydroxyl groups on the alcohols or in the coating which might cause incomplete or slow reaction and no ester linkages which can detract from chemical resistance.

Moreover, there are no aromatic groups in the alcohol that detract from color and gloss retention on weathering and the high molecular weight and low vapor pressure of the alcohols combine to give a highly crosslinkable film with a good combination of adhesion, flexibility and film hardness. The alcohols used herein are also highly suitable for forming such coatings in that they may be modified with ethylene oxide or propylene oxide to give a water soluble polymer for use in water based coatings. It is also fairly simple to emulsify the alcohols to give good water based coatings. The alcohols are themselves, however, water insoluble therefore no water sensitivity is introduced into the cured film such as is found with some lower weight alcohols presently used in the industry.

The alcohols with which the present invention is concerned are obtained through oxo or hydroformylation technology. These alcohols are prepared by hydroformylating an unsaturated alcohol of the formula:

$$H(CH_2)_a(CH=CH)_b(CH_2)_c(CH=CH)_d(CH_2)_e(CH=CH)_f(CH_2)_gCH_2OH$$

where hereinafter (1) a and g are not equal to 0; (2) the integers b plus d plus f are equal to y which has a value of from 1 to 3; (3) the sum of the integers a plus c plus e plus g is equal to x; and (4) x plus 2y is equal to from 13 to 21.

In the alcohols (5) m through t inclusive are integers the sum of which is from 12 through 20; (6) n plus q plus s are 1 through 3, and; (7) n, q, and s are 0 or 1, preferably such that the sum of m through t is from 14 to 18 and x plus 2y is 15 to 19; and (8) k and t are each 3 or greater. It is particularly preferred that h plus k are non-zero integers the sum of which is from 12 to 20, preferably 14 to 18 and where m, h, k and t each are 4, 5 or 6 or greater and that q is 1 and n and s are each zero. Most preferably the starting raw material is oleyl alcohol although linoleyl or linolenyl alcohol may be employed. It is, of course, noted that any number of synthetic unsaturated alcohols may also be employed in the present invention. However, for most purposes the naturally occurring alcohols derived from plant sources are presently most convenient and inexpensive.

The unsaturated alcohol is reacted with hydrogen gas and carbon monoxide in the presence of a rhodium catalyst as later described to form the corresponding formyl alcohol having the formula:

$$CH_3(CH_2)_m[CH(CHO)]_n(CH_2)_p[CH(CHO)]_q(CH_2)_r[CH(CHO)]_s(CH_2)_tCH_2OH$$

wherein the various subscript numbers are as previously described.

The addition of hydrogen and carbon monoxide is accomplished in practice by conveniently adding stoichiometric amounts of the hydrogen and carbon monoxide to give the formyl alcohol. To assure completeness of the reaction the amounts of hydrogen and carbon monoxide may be each maintained at from about 1.5:0.5 to about 0.5:1.5 molar ratio to one another. It is noted that the ratio is not critical as long as the pressure is maintained in the reaction vessel by the component gases and that the amount of hydrogen is not so great as to substantially reduce the unsaturated starting material.

The rhodium catalyst as later described is necessary in the hydroformylation reaction in that it has been found that the use of the more conventional cobalt catalyst results in a substantial amount of cross-linking gelation. It is believed that the gelation is due to the coproduction of polyhemiacetals and polyacetals in competition with the production of the hydroformylated alcohol. It was at first believed by the author that it would be necessary, even with a rhodium catalyst, to employ the ester of the unsaturated alcohol e.g. oleyl acetate to avoid the unwanted byproducts. Of course, the ester is more expensive and eventually is converted to the alcohol in any event.

Higher yields of product are obtained through the use of the rhodium catalysts than if a cobalt catalyst is employed. It has also been observed that a much higher degree of isomerization of the double bond occurs with a cobalt catalyst than with a rhodium catalyst.

The conditions for pressure and temperature during the hydroformylation are conveniently conducted at from about 90 degrees C. to about 170 degrees C., preferably from about 110 degrees C. to about 130 degrees C. Above the higher temperatures listed increased amounts of unwanted byproducts are formed in the reaction mixture. The pressure conditions are such that the pressure in the sealed system is maintained at from about 20 to about 500 atmospheres, preferably from about 30 to about 100 atmospheres absolute during the hydroformylation.

The preferred end product obtained from conducting the foregoing process is 9(10) formyl octadecanol when the starting material is oleyl alcohol. The positioning of the 9(10) indicates that the product obtained is a mixture of the 9 and 10 isomer with respect to the formyl group. One additional reason for using a rhodium catalyst is that if a cobalt catalyst were employed a considerable amount of terminal aldehyde would be formed due to bond migration prior to the addition of the formyl group. When the terminal aldehyde group is formed the resultant alcohol obtained by carrying out the remainder of the process is unsuitable for many of the purposes that the desired alcohols may be utilized. That is, it has been found that terminal aldehydes are high melting thus resulting in solid polyglycidyl ethers which require solvents and/or high temperatures for use as curing agents.

It should also be appreciated that if 9,12-linoleyl alcohol is the starting material then the formyl alcohol so formed will be a 9(10), 12(13) diformyloctadecanol. That is, the end product obtained here will actually be a mixture of the 9-12, 9-13, 10-12, 10-13 diformyl alcohol.

Similarly, without discussing all the particular isomers present when 9,12,15-linolenyl alcohol is employed the product so obtained will be a mixture of the 9(10),12(13),15(16) triformyloctadecanol isomers.

It is particularly important that the expensive rhodium catalyst is recovered. This may be conveniently done by distillation of the formyl alcohol leaving the rhodium in the residue. What is particularly surprising is that the rhodium can be recovered from the distillate in that the art would predict that when hydroformylating an unsaturated alcohol that the products obtained would include considerable quantities of polyhemiacetals and polyacetals as a portion or all of the reaction product and that these products would not be recoverable by distillation. Thus, not only is the desired end product achieved in a high degree of purity and yield through the use of the rhodium catalyst but the rhodium catalyst is recoverable in extremely high quantities from the reaction mixtures.

It should also be emphasized that if the polyhemiacetals and polyketals were formed in the reaction mixture that it is very likely that the reaction components would undergo a great change in viscosity to the point of forming a semi-solid product due to the extensive cross-linking of the acetal and ketal linkages. Thus a substantial reason exists for avoiding the polyhemiacetal and formation through the use of a rhodium catalyst.

It may be stated that the polyacetal and polyhemiacetal formation might be prevented by the utilization of the corresponding unsaturated acid or its ester in place of the unsaturated alcohol. However, this substitution which eventually involves the acid ester is undesirable in that an aqueous neutralization step is required which forms a soap as a byproduct. The soap so formed then emulsifies the reaction products and the water present to make separation extremely difficult thus diminishing recovery of both the alcohol and the expensive catalyst. Thus the present invention is highly selective to both the unsaturated alcohol and the particular rhodium catalyst so employed.

Any convenient source of rhodium may be employed as in the present reaction mixture the rhodium catalyst is actually converted through the presence of the hydrogen and carbon monoxide into its active form which is a rhodium carbonyl hydride. Conveniently, the source of rhodium for use in the rhodium catalyst may be rhodium metal, rhodium oxide, and various other rhodium salts such as rhodium chloride, rhodium dicarbonyl chloride dimer, rhodium nitrate, rhodium trichloride and other similar materials.

The rhodium catalyst in the present hydroformylation reaction is preferably present with a ligand such as a trisubstituted phosphine or trisubstituted phosphite. The term trisubstituted includes both alkyl and aryl compounds. A particularly valuable ligand for the rhodium carbonyl hydride is a triphenylphosphite or triphenylphosphine in that both compounds are particularly useful in minimizing migration of the double bond thereby avoiding a large number of isomers with respect to the formyl group including the undesired terminal formyl compound as previously discussed. In general triaryl phosphines or triarylphosphites may be used for this purpose in the formation of the rhodium carbonyl hydride ligand. In addition, the foregoing materials are extremely valuable in minimizing the undesired reaction of saturation of the double bond or the reduction of the formyl group. This frequently occurs in the absence of such ligands because the rhodium catalyst functions excellently as a hydrogenation catalyst. That is the ligand tends to eliminate such side reactions.

In general any one of several other additional ligands may be used with the rhodium catalyst. Such additional ligands are discussed in the Selective Hydroformylation of Unsaturated Fatty Acid Esters by Frankel in the Annals N.Y. Academy of Sciences 214:79 (1973).

The various ligands are conveniently employed in mole ratio to the rhodium metal content of the catalyst of from about 2 to 50 preferably from 3 to 20. The rhodium catalyst based upon its metal content is conveniently employed in catalytic amounts preferably from about 20 ppm to about 10,000 ppm, most preferably from about 50 ppm to about 500 ppm by weight of the unsaturated alcohol.

The various formyl alcohols are useful as previously stated in preparing the highly desired gem-bis(hydroxymethyl) alcohols. The alcohols may be formed from the foregoing formyl alcohols via a Tollens' reaction (aldol condensation followed by a crossed-Cannizzaro reaction).

Schematically the Tollens' reaction is as described below.

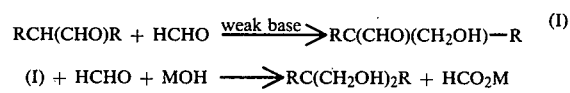

$$(I) + HCHO + MOH \longrightarrow RC(CH_2OH)_2R + HCO_2M$$

wherein the above formula R indicates an organic moiety, compound (I) is a hydroxymethyl aldehyde and MOH is a strong base.

The Tollens' reaction is thus carried out by reacting one mole of a monoformylated alcohol with two moles of formaldehyde in an inert atmosphere such as nitrogen. Where the formyl alcohol contains more than one formyl group, two moles of formaldehyde are required for each formyl group present. Thus, if the reactant is formyloctadecanol then two moles of formaldehyde are required for conversion to the gem-bis(hydroxymethyl) alcohol whereas is linoleyl alcohol is utilized in the first instance to give a diformyloctadecanol then four moles of formaldehyde are required to obtain the digeminaloctadecanol. Conveniently an excess of up to 1.5, preferably up to 1.2 times the amount of formaldehyde actually required to form the corresponding gem-bis(hydroxymethyl) alcohol is employed in the present invention. A convenient manner of adding the formaldehyde in the Tollens' reaction is by using a methanol solution of formaldehyde.

The Tollens' reaction utilizes a strong base as both a reactant and a catalyst. Such strong bases include sodium, potassium or calcium hydroxide. Other strong bases such as carbonates or other hydroxides may be used as well. The strong base is conveniently employed on an equivalent basis per formyl group to convert the formyl group to the hydroxy methyl group. The amount of base required in the Tollens' reaction is at least an equivalent of that required preferably up to 1.5, most preferably up to 1.2 equivalents. The Tollens' reaction is conducted at a temperature of from about 0 degrees C. to about 100 degrees C., preferably from about 20 degrees C. to about 70 degrees C.

The crude gembis(hydroxymethyl) alcohol so formed is washed with water to remove any excess caustic and salts formed and then obtained in a relatively pure state by vacuum drying.

In obtaining the gem-bis(hydroxymethyl) alcohol of the present invention the crossed-Cannizzaro reaction predominates over the rate of reaction for the simple Cannizzaro reaction.

The Cannizzaro reaction which is promoted by base, water and heat is the process by which an aldehyde reacts with itself to form the corresponding alcohol and formate salt. That is, in the present invention the formyl group on the formyl alcohol reacts faster with formaldehyde to give the alcohol than does the formaldehyde react with itself despite the steric hinderance of the larger formyl alcohol molecule.

It is also surprising that the formation of hemiacetal which may be acid or base catalyzed does not occur upon the addition of base to the formyl alcohol while forming the intermediate hydroxymethyl formyl alcohol. Thus two potential side reactions, the Cannizzaro and the hemiacetal formation (and thereafter the acetal) which might be expected given the reactants and the processing conditions involved do not in fact occur and the useful alcohol is obtained in substantial quantities.

An alternative method of accomplishing the formation of the geminal alcohol is to use only about one-half the equivalent amount of the formaldehyde required in the Tollens' reaction thereby forming the corresponding hydroxymethyl formyl alcohol via the aldol condensation. That is, the hydroxymethyl group is attached to the carbon in the alpha position to the formyl group. Where a polyformyl alcohol is the intermediate product the formaldehyde is halved from that utilized in the Tollens' reaction to give the corresponding polyhydroxymethyl polyformyl alcohol.

This variation of forming the geminal alcohol eliminates the need for the strong base required in the Tollens' reaction and utilizes instead only catalytic amounts of base which may be either a weak or strong base. A preferred weak base is triethylamine. Even here some care must be taken as it is possible even when using a weak base to obtain compound (I) as the Cannizzaro reaction may compete with the aldol condensation.

The hydroxymethyl formyl alcohol so formed by this alternative route is then reduced to the alcohol conveniently by using hydrogen gas and a suitable hydrogenation catalyst such as copper chromite, or nickel, via conventional hydrogenation practice or by lithium aluminum hydride production. A significant advantage to the alternative route is the absence of large amounts of salt and solvents needed in the Tollens' reaction route.

A distinct advantage in the geminal alcohol of the present invention is that it is a liquid at room temperature and further has no tertiary hydrogens which are a weak point for chemical attack on the molecule.

A mixture of the diol and the geminal alcohol is obtained by reacting the unsaturated alcohol to obtain the corresponding formyl alcohol. Thereafter the formyl alcohol is split into two streams, the first of which is processed as previously discussed to give the geminal alcohol while the second stream is reduced by hydrogenation to give the diol. The hydrogenation is generally carried out as discussed in the alternative route for preparing the geminal alcohol. The diol and the geminal alcohol are then recombined in the desired proportions which are preferably in a weight ratio of from about 2:1 to about 1:100 more preferably from about 1:1 to about 1:75. The liquid nature of the geminal alcohol aids in solubilizing the normally solid diol thus giving a product which is easy to formulate.

The other component utilized in forming the compositions of the present invention is the methylolamino compound. These materials are generally sold as ethers of the reaction product of formaldehyde and an amino material such as melamine, urea, thiourea, guanamines, substituted thioameline, triaminopyrimidine, 2-mercapto-4,6-diaminopyrimidine, 3,5-diaminotriazole, carbamylguanazole, 2,4-diaminothiodiazole, glycouril, and 2-oxo-4,5-diaminoparabanic acid.

Basically, the most practical components for use herein are the melamine, urea, glycouril and guanamine materials. Stated simply, the preparation of such materials is old in the art and it is sufficient to say that formaldehyde is reacted with the amino hydrogens in varying amounts depending upon the type of resin which is desired. Thus with melamine which contains three primary amine groups, it is necessary to react at least two of the amine hydrogens in order to form a product which will crosslink with a trifunctional alcohol. That is, the adduct of the amino compound and the formaldehyde is ordinarily sold as an ether in most cases that of butanol. Etherification prevents the reaction product of the amino compound and formaldehyde from cross-linking and solidifying through continued reaction of the hydroxyl group on one of the reaction products with an unreacted amine hydrogen on another molecule of the amine compound. The etherification also modifies water and organic phase solubility, lessens self-condensation during cure; and give a product which is less hygroscopic.

The particular advantage to using melamine based materials as the amino component is that both of the hydrogens on any amino group are available for reaction with formaldehyde, whereas when using urea it is difficult to react the second hydrogen following addition of the first mole of formaldehyde to the amino group. A particular advantage as previously noted is in the use of the polyhydric alcohols of the present invention other than the diol as cross-linking agents for urea formaldehyde. That is, as previously stated, urea formaldehyde tends to react with two moles of formaldehyde to give a dihydric material thereby requiring that an alcohol having greater functionality than two be used in order to obtain a highly cross-linked product. However, if one is merely looking for a thermosetting material which is easy to form then the diol and urea formaldehyde provides exceptional properties herein.

Set out below are various tradenames of methylolamino compounds used in the present invention. These alcohols have been conveniently etherified with a material such as butanol or methanol or other monohydric alcohol to provide storage stability. A particularly useful material in the present invention is Cymel 303 obtained from the American Cyanamid Company. Other useful resins also available from American Cyanamid include the melamine formaldehydes sold as Cymel 300, 301, 350, 370, 373, 380, 1116, 1156 and 1130. The benzoquamines are sold as Cymel 1123, 1125 and 1134.

The urea-formaldehyde resins included herein are available from American Cyanamid and include Beetle 60, 65, 80 and XB-1050. Partially alkylated melamine resins include Cymel 325, 370, 380, 243, 245, 248, and 255. The foregoing resins are described in a publication of American Cyanamid entitled Amino Cross-Linking Agents.

Additional methylolamino compounds include the Guanamides and benzoguanamines; substituted thioameline; triaminopyrimidine; 2-mercapto-4,6-diaminopyrimidine; 3,5-diaminotriazole; carbamylguanazole; 2,4-diaminothiodiazole; 2-oxo-4,5-diaminoparabanic acid and mixtures thereof.

As previously noted it is also possible to react the alcohols of the present invention with ethylene oxide, styrene oxide, propylene oxide, or caprolactone in order to modify water solubility and to provide greater flexibility in the coating. The adduction of the alcohol with ethylene oxide, propylene oxide, adipic acid, phthalic acid or caprolactone is done conventionally and is further explained in the examples listed herein.

A particularly useful variation of the present invention is to utilize component (a) and component (b) in mixtures with one another in a weight ratio of from about 2:1 to 1:100 respectively in order to provide the proper viscosity and liquid nature which is highly desirable herein. A more preferable range for mixtures of these components is from about 1:1 to about 1:75. An additional valuable product is obtained by partially adducting the methylolamino resin with the diol or polyol and then completing the adduction at the coating plant. Such preadducted products require even lower energy requirements upon curing.

The coatings are prepared conveniently by using the methanol or butanol adduct of the methylolamino compound which is mixed with the polyol. The coating is applied by brushing, knife edge, spray, or other conventional means followed by baking. Acid catalysts are employed at low levels to effect the cure.

The following examples indicate the use of the present invention.

EXAMPLE I

The manufacture of the formyloctadecanol precursor is accomplished by charging a 1 liter Magne Drive, 316 SS autoclave with 606 grams (2.26 moles) of oleyl alcohol, 3.01 grams of 5% rhodium on alumina and 3 grams (9.68 moles) of triphenylphosphite.

The autoclave is sealed and pressurized to 10 atmospheres with nitrogen under stirring and then vented to atmospheric pressure. The nitrogen purge is repeated twice more to ensure removal of any oxygen present in the autoclave.

The autoclave is then pressurized a third time with premixed carbon monoxide and hydrogen gas in a 1 to 1 molar ratio to 68 atmospheres at which point heating is started. Stirring is manually controlled at 1250 rpm and the uptake of the mixture of the gases starts at about 100 degrees C. The reaction conditions are then maintained at a temperature of 130 degrees C. and the gas pressure at 70 to 75 atmospheres.

The reaction is substantially complete after 4.6 hours and is determined by the cessation of the gas uptake. The confirmation of completeness of the reaction is obtained by sampling the mixture and determining through gas chromatograph analysis that there is less than 1% of the starting alcohol in the mixture.

The reaction mixture is then cooled to 75 degrees C., vented to atmospheric pressure and purged twice with nitrogen. The contents of the autoclave and then discharged at 75 degrees C. under nitrogen pressure through a pressure filter. The yield of the formyloctadecanol is greater than 90%. Atomic absorption analysis of the filtered product showed 244 ppm of rhodium.

The reaction may be modified by using triphenylphosphine in place of the triphenylphosphite. Alternatively, the oleyl alcohol may be substituted for by linoleyl or linolenyl alcohol. The reaction temperature may also be lowered to 90 degrees C. at which point the reaction takes a substantially longer period of time to proceed. As a second alternative, the reaction temperature can be raised to about 170 degrees C. and the reaction time considerably lowered. However, some decomposition of the end product may occur above the 170 degree figure so it should not be exceeded.

In similar fashion the mixture of carbon monoxide and hydrogen may be varied as previously described in the Detailed Description of the Invention and may also be varied between about 20 and 500 atmospheres of pressure. The lower end of the pressure range of course, slows the reaction rate down while the higher pressure condition increases the reaction but also increases the probability that some of the starting alcohol will be saturated by the hydrogen.

EXAMPLE II 5.26 moles (1570 grams) of the formyloctadecanol obtained from Example I is charged into a 5 liter glass round bottom reaction flask equipped with a heat exchanger coil, thermocouple, stirrer, addition inlet, reflux condensor and combination glass electrode. A further reaction charge of 695 grams (12.87 moles) of a 55.6% formaldehyde in methanol solution is added under a nitrogen blanket. A 40% solution of sodium hydroxide is made by dissolving 245.7 grams (5.95 moles) of sodium hydroxide in 368 grams of water under a nitrogen blanket. The caustic solution is added to a charge tank and connected to the feed side of a metering pump.

The reaction mixture is heated to 30 degrees C. and the caustic carefully added by means of a metering pump with stirring to adjust the pH to about 10.9. After about forty minutes at 30 degrees C. the addition of the 40% caustic solution is started at a rate of 9.65 milliliters per minute and the temperature of the reaction is increased to 60 degrees C. The addition of caustic required about 45 minutes and the reaction temperature was maintained at 60 degrees C. Gas chromatograph analysis of a sample taken at this time indicated that the reaction was complete and that the gem-bis(hydroxymethyl) alcohol corresponding to the formyloctadecanol is formed.

The reaction is held for an additional 20 minutes at 60 degrees C. after completion of the caustic addition. The stirring is then stopped and the lower aqueous phase (816 grams) is allowed to separate.

After washing of the crude gem-bis(hydroxymethyl) octadecanol and its drying under vacuum the amount recovered is 1711 grams corresponding to a yield of greater than 90%.

Alternatively linoleyl or linolenyl alcohol derivatives of Example I may be employed under similar conditions. The reaction temperature for the production of the bishydroxymethyloctadecanol is to use 6.43 moles of the 55.6% formaldehyde solution thereby yielding the corresponding hydroxymethyl formyloctadecanol as an isolatable product. This material is then reduced through catalytic hydrogenation with copper chromite or through the use of lithium aluminum hydride to give the gem-bis(hydroxymethyl)octadecanol.

An alternative method of obtaining the bishydroxymethyloctadecanol is to use 6.43 moles of the 55.6% formaldehyde solution therey yielding the corresponding hydroxymethyl formyloctadecanol as an isolatable product. This material is then reduced through catalytic hydrogenation with copper chromite or through the use of lithium aluminum hydride to give the gem-bis(hydroxymethyl) octadecanol.

EXAMPLE III

The formyl alcohol of Example I is divided into separate streams and one part is converted to the gem-bis(-hydroxymethyl) alcohol of Example II. The second stream is hydrogenated by charging 1928 grams (6.46 moles) of the formyloctadecanol and a slurry of 108 grams of water-wet Raney nickel which has been washed twice with two 100 ml portions of ethanol.

The autoclave (316 SS) is sealed and pressurized to 10 atmospheres of nitrogen with stirring. The autoclave is then vented and then purged twice more with nitrogen to ensure that the oxygen is substantially removed.

The autoclave is then pressurized to 55 atmospheres with hydrogen and stirring is commenced. The temperature is controlled between about 100 degrees C. and 116 degrees C. with the hydrogen uptake complete to give the 9(10)-hydroxymethyloctadecanol (diol) in about 20 hours at a yield of greater than 90%.

The diol is then mixed with the gem-bis(hydroxymethyl) alcohol in the desired proportions to give a liquid product.

EXAMPLE IV

A resin coating is made according to the present invention utilizing 9(10) bis-hydroxymethyloctadecanol (triol) and Cymel 303 melamine resin available from American Cyanamid. The Cymel 303 product is a fully methylated melamine formaldehyde resin having an average equivalent weight of 160. The product is formulated according to the following formulation:

| 9(10) bis-hydroxymethyloctadecanol | 114 | parts |
|---|---|---|
| Cymel 303 | 160 | parts |
| Butanol | 55.1 | parts |
| Catalyst 4040 | 1.37 | parts |
| | 330.47 | parts |

Catalyst 4040 is paratoluenesulfonic acid, a strong acid catalyst.

The coating is prepared by mixing the components in a pot and the mixture has a solids content of 82.91% by weight. Application of the coating is by conventional air spray and curing is accomplished at 121 degrees Centigrade for 30 minutes to a pencil hardness of 2H. The resin is coated onto Bonderite 1000 cold rolled steel plate. The film has been observed to build at one- one thousandth (1/1000) of an inch dry film thickness (1 mil).

Forward impact resistance passes at 20 inch pounds and the reverse passes at 2 inch pounds. A cross-hatch adhesion test indicates that 100% of the coating is retained upon removal of the tape. 24 hour chemical resistance to 20% sodium hydroxide and 100% deionized water indicate no affect.

This example is then repeated using the alternative materials of examples II and III with similar results.

EXAMPLE V

A methylolamino cured compound system is prepared by using 9(10)hydroxymethyloctadecanol (diol) in combination with Cymel 303 as previously described.

The product is prepared according to the following formulation at room temperature in a pot:

| 9(10) hydroxymethyloctadecanol | 146 | parts |
|---|---|---|
| Cymel 303 | 160 | parts |
| Catalyst 4040 | 1.37 | parts |
| Butanol | 30.70 | parts |
| | 338.07 | parts |

The above described composition contains 90.51% parts by weight of solids. Application is to cold rolled Bonderite 1000 by conventional air spraying. The product sprayed very well at this concentration and is sprayable at 100% solids concentration upon removal of the solvent.

The film is cured to a thickness of 1 mil dry film by heating the coated article to 121 degrees Centigrade for 30 minutes to a pencil hardness of H. The forward impact resistance is greater than 40 inch pounds and the reverse is greater than 5 inch pounds.

The product passes a cross-hatch adhesion with 100% coating retention test and exhibits good chemical resistance to 40% sulfuric acid, 20% sodium hydroxide, and 100% deionized water.

EXAMPLE VI

A product is prepared using 9(10) bis-hydroxymethyloctadecanol which has been preadducted with 1 equivalent of propylene oxide to give a partially propoxylated alcohol having an equivalent weight of 174.

This product is then combined as previously described with Cymel 303 by adding the polyol in a pot at room temperature.

| Propoxylated bis-hydroxymethyloctadecanol | 174 | parts |
|---|---|---|
| Cymel 303 | 160 | parts |
| Catalyst 4040 | 1.67 | parts |
| Butanol | 55.10 | parts |
| | 390.77 | parts |

The solids content in the pot is 85.47% and application to Bonderite 1000 is made using conventional air spray technology followed by curing at 121 degrees Centigrade for 30 minutes to a pencil hardness of HB. The dry film thickness builds to 1 mil and the observed impact resistance is greater than 30 forward and 10 reverse. The ethylene oxide adduct is made in similar fashion following this example.

EXAMPLE VII

Another coating formulation is prepared using 9(10) bis-hydroxymethyloctadecanol which has been modified with caprolactone and finally reacted with Cymel 303.

The equivalent weight of the caprolactone modified polyol is 312.2 indicating that the equivalent ratio of polyol to caprolactone originally was about 1 to 1.7.

The product is combined in a pot at room temperature to give a formulation according to that shown below:

| Caprolactone modified polyol | 312.2 | parts |
|---|---|---|
| Cymel 303 | 160 | parts |
| Catalyst 4040 | 2.36 | parts |
| Butanol | 75 | parts |

|  |  |
|---|---|
| | 549.56 parts |

The solids content in the above described formulation is 85.92%. Application of the product to Bonderite 1000 is made by conventional air spraying followed by curing in an oven at 121 degrees Farenheit for 30 minutes to a pencil hardness of B. The forward impact passes 50 inch pounds and reverse passes 30 inch pounds. The film builds to a thickness of 1 mil. Substantially similar coatings are obtained by substituting in an equivalent basis for the modified polyol the same material modified with adipic acid or the phthalic acids.

EXAMPLE VIII

A resin coating is made utilizing Cymel 370 which is a partially methylated melamine formaldehyde resin. The polyol used in this example is 9(10) hydroxymethyloctadecanol.

The average equivalent weight of the Cymel 370 is 275.

The product is formulated as shown below:

| | | |
|---|---|---|
| 9(10) hydroxymethyloctadecanol | 146 | parts |
| Cymel 370 (88% solids, 12% isopropanol and isobutanol) | 275 | parts |
| Catalyst 4040 | 1.94 | parts |
| Butanol | 55.1 | parts |
| | 478.04 | parts |

The solids content of the above formulation is 81.16% and application to Bonderite 1000 is by conventional air spray which is then cured at 121 degrees Centigrade for 30 minutes to a pencil hardness of H. The film is also observed to build to 1 mil thickness as a dry film.

The forward impact of the resistence is greater than 15 inch pounds and the reverse is greater than 5 inch pounds.

A cross-hatch adhesion test indicates that 80% of the coating is retained. Q.U.V. accelerated exposure cycle at four hours of ultraviolet light at 60 degrees C. and four hours of humidity at 50 degrees C. After 1600 hours of exposure there being no change in color or gloss. Substantially similar results are obtained by utilizing a mixture of the diol and 9(10) bis-(hydroxymethyl) octadecanol or by replacing the Cymel 370 with glycouril or the other named methylolamino compounds.

EXAMPLE IX

The ethylene oxide adduct of 9(10) bishydroxymethyloctadecanol is reacted with Cymel 370 as previously described. The hydroxyl equivalent weight of the ethylene oxide adduct of the polyol is 296.

The product is prepared in a pot at room temperature as follows:

| | | |
|---|---|---|
| Ethylene oxide adduct of the polyol | 295.9 | parts |
| Cymel 370 | 275 | parts |
| Catalyst 4040 | 2.69 | parts |
| Butanol | 50 | parts |
| | 623.59 | parts |

The solids content in the above-described formulation is 86.26%. Application to cold rolled Bonderite 1000 is by conventional air spray and the coated surface is cured at 121 degrees Centigrade for 30 minutes. The forward impact exceeds 60 inch pounds and the reverse impact exceeds 40 inch pounds.

The Q.U.V. accelerated exposure cycle test was also repeated on this example with satisfactory results.

EXAMPLE X

A coating is prepared using the 9(10) bishydroxymethyloctadecanol and Cymel 325. Cymel 325 is a highly methylated melamine formaldehyde resin which has a high secondary amino content. Cymel 325 is available from American Cyanamid at an 80% solids content cut in isobutanol. Cymel 325 is also described as a polymeric material with no particularly determinable equivalent weight since it has a high tendency to self condense.

This product is accelerated by the use of the catalyst 296-9, a weak acid catalyst from American Cynamid which is described as citric acid.

The product is combined in a pot at room temperature according to the following formulation:

| | | |
|---|---|---|
| Polyol | 114 | parts |
| Cymel 325 | 303 | parts |
| Catalyst 296-9 | 17.82 | parts |
| Butanol | 55.1 | parts |
| | 489.92 | parts |

The solids content of this formulation is 72.75% and application is made by conventional spray drying. The surface to which the resin is applied is cold rolled Bonderite 1000 which is then cured at 65 degrees Centigrade for four hours to a pencil hardness of H. The forward impact resistance exceeds 20 inch pounds while the reverse passes 2 inch pounds.

A Cleveland humidity cabinet test is conducted and the coated surface is found to be acceptable to 2000 hours of exposure with no blistering or apparent water absorption. The dry film build is 1 mil.

What is claimed is:

1. A composition of matter which is the product of a methylolamino compound and a member selected from the group consisting of:

(a) $H(CH_2)_h CH(CH_2OH)(CH_2)_k CH_2OH$ and (b)
$CH_3(CH_2)_m[C(CH_2OH)_2]_n(CH_2)_p[C(CH_2OH)_2]_q$-$(CH_2)_r[C(CH_2OH)_2]_s(CH_2)_t CH_2OH$ and mixtures thereof wherein n plus q plus s are integers the sum of which is from 1 to 3; k and t are 3 or greater; n, q, and s are 0 or 1; m through t are integers the sum of which is from 12 to 20; and, h plus k are non-zero integers the sum of which is from 12 to 20.

2. The composition of claim 1 wherein the sum of m through t is from 14 to 18, k and t are each 3 or greater and h plus k are each 4 or greater and that the sum thereof is from 14 to 18.

3. The composition of claim 1 wherein component (a) and component (b) are present respectively in a weight ratio of from about 2:1 to 1:100.

4. The composition of claim 1 wherein the methylolamino compound is the reaction product of formaldehyde and a member selected from the group consisting of:
(a) melamine;
(b) urea;
(c) thiourea;
(d) guanamines and benzoguanamines;
(e) substituted thioameline;
(f) triaminopyrimidine;
(g) 2-mercapto-4,6-diaminopyrimidine;
(h) 3,5-diaminotriazole;
(i) carbamylguanazole;
(j) 2,4-diaminothiodiazole;
(k) 2-oxo-4,5-diaminoparabanic acid; and
(l) glycouril,
and mixtures thereof.

5. The composition of claim 1 wherein component (a) and component (b) are modified with a member selected from the group consisting of ethylene oxide, propylene oxide, styrene oxide, adipic acid and the phthalic acids and caprolactone and mixtures thereof.

6. The composition of claim 1 wherein component (a) is 9(10) hydroxymethyloctadecanol.

7. The composition of claim 1 wherein component (b) is 9(10) bis-hydroxymethyloctadecanol.

8. The composition of claim 1 wherein a is 1 and n and s are each 0.

9. The composition of claim 1 wherein m, t, h, and k are each 4 or greater.

10. The cured product of claim 1.

* * * * *